United States Patent [19]

Maurel et al.

[11] 4,296,073

[45] Oct. 20, 1981

[54] HIGH TEMPERATURE ATTACK OF ORES BY MEANS OF A LIQUOR ESSENTIALLY CONTAINING A SOLUBLE BICARBONATE

[75] Inventors: Pierre Maurel; Francois Nicolas, both of Aix-en-Provence; Bernard Bosca, Gardanne, all of France

[73] Assignee: Aluminum Pechiney, Lyons, France

[21] Appl. No.: 7,920

[22] Filed: Jan. 31, 1979

[30] Foreign Application Priority Data

Sep. 2, 1978 [FR] France ............... 78 04468

[51] Int. Cl.³ ........................... C01G 43/00
[52] U.S. Cl. ..................... 423/3; 423/17; 423/61; 423/68
[58] Field of Search ........... 423/15, 17, 61, 68, 423/3

[56] References Cited

U.S. PATENT DOCUMENTS

| | | | |
|---|---|---|---|
| 2,815,263 | 12/1957 | Eldredge | 423/17 |
| 2,979,378 | 4/1961 | Koble | 423/17 |
| 2,992,887 | 7/1961 | Thunaes et al. | 423/17 |
| 3,017,241 | 1/1962 | McLean | 423/17 |
| 3,022,135 | 2/1962 | Hart | 423/17 |
| 3,429,693 | 2/1969 | Bauer et al. | 423/61 |
| 4,046,852 | 9/1977 | Vertes et al. | 423/61 |
| 4,061,711 | 12/1977 | Morgan et al. | 423/68 |

FOREIGN PATENT DOCUMENTS

| | | | |
|---|---|---|---|
| 493787 | 6/1953 | Canada | 423/17 |
| 2804910 | 8/1978 | Fed. Rep. of Germany | 423/17 |

OTHER PUBLICATIONS

"Int. Conf. on Peaceful Uses of Atomic Energy", vol. 8, pp. 8,9, 18–22, 28, 32–37, (1955).

Primary Examiner—Edward A. Miller
Attorney, Agent, or Firm—McDougall, Hersh & Scott

[57] ABSTRACT

A process for the oxidizing attack at high temperature of ores containing at least one metal belonging to the group formed by uranium, vanadium and molybdenum, by means of an aqueous liquor containing a majority of sodium bicarbonate and a minority of sodium carbonate according to a ratio by weight of sodium bicarbonate to sodium carbonate of at least 1.5, in the presence of free oxygen injected into the reaction medium, this medium being maintained at a temperature of between 160° C. and 300° C. for at most six hours.

13 Claims, No Drawings

HIGH TEMPERATURE ATTACK OF ORES BY MEANS OF A LIQUOR ESSENTIALLY CONTAINING A SOLUBLE BICARBONATE

The present invention relates to a new process for the oxidising attack, at high temperature, of ores containing at least one metal from the group formed by uranium, vanadium and molybdenum by means of an aqueous liquor containing a majority of sodium bicarbonate and a minority of sodium carbonate, into which a gas containing the free oxygen is introduced, this process being intended to permit the metal to be obtained in the form of a soluble salt.

It is already known that ores such as, for example, the uraniferous ores have been subjected to oxidising alkaline attacks by means of solutions which are carbonated but which also contain a small proportion of sodium bicarbonate. This attack was carried out in the presence of free oxygen which was blown into the hot reaction medium.

The literature specialising in this subject has thus described modes of operation for carrying out this oxidising alkaline attack (The Extractive Metallurgy of Uranium, by Robert C. Merritt, edited by Colorado School of Mines Research Institute, 1971 edition, page 83 et seq).

According to a first mode of operation, a uraniferous ore, preferably having a high carbonate content, was attacked by a liquor containing from 40 to 50 g/l of $Na_2CO_3$ and from 10 to 20 g/l of $NaHCO_3$ in the presence of oxygen or air blown into the reaction medium. The conditions of the attack which took place in an autoclave would be located within a temperature range of between 95° C. and 120° C., a total pressure of between 2 and 6.5 bar prevailing in the chamber with attacking times varying between 4 and 20 hours.

According to a second mode, the same uraniferous ore having a high carbonate content was attacked by the same liquor containing from 40 to 50 g/l of $Na_2CO_3$ and from 10 to 20 g/l of $NaHCO_3$, in the presence of oxygen or air blown into the reaction medium. However, the conditions of the attack which was carried out in a "Pachuca" were different: the temperature was within the range of from 75° C. to 80° C., while the pressure at which the air or oxygen was injected into the reaction medium was situated within the range of from 2 to 3 bar for an attacking time of 96 hours.

According to the author, such modes of operation, which have turned out to be of value in the attack of certain uraniferous ores are difficult to apply when refractory or again siliceous ores are to be attacked.

In addition, these modes of operation demand considerable residence times in the reactor in order to render the uranium sufficiently soluble.

Consequently, owing to the disadvantage mentioned above, the applicants, in pursuing their research, have developed a new process for the oxidising attack of ores containing at least one metal from the group formed by uranium, vanadium and molybdenum, which allows the kinetics of the reaction as well as the yields of the desired metal or metals to be improved and which allows the ores having a widely varying composition to be treated, in particular those which are rich in carbonates, those in which the metal or metals are combined with organic materials and those which, up until now, originated for the skilled man from an attack in an acid medium.

The new process according to the invention involving the oxidising attack at high temperature and under pressure of ores containing at least one metal from the group formed by uranium, vanadium and molybdenum by means of an aqueous liquor containing sodium carbonate and sodium bicarbonate in the presence of free oxygen blown into the reaction medium in order to obtain the desired metal or metals in the form of salts which are soluble in an aqueous solution, in characterised by the fact that the ore is treated with an aqueous liquor containing a majority of sodium bicarbonate and a minority of sodium carbonate, and in that the reaction medium is maintained at a temperature of between 160° C. and 300° C. for a period not exceeding 6 hours.

It is well known that the oxidising attack of the above-mentioned ores takes place as a result of the blowing in of free oxygen which is introduced in the form of an oxygen-containing gas such as air, oxygen-enriched air or again oxygen alone. The oxygen is blown in under a pressure which is sufficient for the partial pressure of oxygen in the reactor to be situated within the range of from 0.1 to 20 bar, but preferably between 5 and 15 bar.

As already mentioned, the majority of the attacking aqueous liquor is composed of sodium bicarbonate and a minority of sodium carbonate so that the ratio by weight of $NaHCO_3/Na_2CO_3$ is at least 1.5. However, the applicants have observed that it was preferable to select the ratio in the range limited by the values 4 to 80.

Depending upon the nature of the ore, the above-mentioned ratio is fixed at the selected value and the concentration of the liquor intended for the attack can vary within wide limits for each of the reagents present. Thus, the concentration of $NaHCO_3$ can vary between 10 g/l and 300 g/l, but preferably between 80 g/l and 160 g/l whereas the concentration of $Na_2CO_3$ can vary within the range of from 0 g/l to 50 g/l, but preferably between 0 g/l to 30 g/l.

According to a variation which has been found to be of value in the scope of the process according to the invention, some $CO_2$ gas can be blown into the reaction medium during the attack. This gas can be blown in continuously or discontinuously at a constant or variable flow rate.

Thus, the injection of this $CO_2$ gas permits the $CO_3H$ content of the reaction medium to be monitored and regulated and it can be modified by the fact that the quantity of oxygen blown in can be larger than that actually required to permit oxidation. The applicants have made a special study of the range of temperatures to be used for the attack. Thus, they have been able to define a range of temperatures which are particularly favourable located between the limit values of 160° C. and 300° C. In th majority of cases, however, the attacking temperature can preferably be situated between 180° C. and 220° C.

The attacking time is generally short, not exceeding 6 hours and preferably lasting between half an hour and 2 hours.

According to a particular embodiment, it may be advantageous in the case of certain ores to introduce a conventional oxidation catalyst into the reaction medium to improve the kinetics of the attack.

In practice, the process according to the invention can also comprise one or more preliminary treatments of the ore before it is actually attacked in accordance with the above-mentioned conditions. Firstly, it may be necessary to subject the ore not to conventional crushing but to particularly advanced crushing in order to multiply the interfaces between the particles of the ore and the attacking liquor. Similarly, it may be advantageous to eliminate the organic materials contained in the ore beforehand by calcination at a controlled temperature. However, it is also possible to subject the ore to a preliminary treatment with a whitewash, with a sodium liquor or again with a calcium-sodium liquor, with a liquor containing $CO_3^=$ and/or $CO_3H^-$ ions combined with at least one cation such as $Na^+$, $K^+$, $NH_4^+$, $Ca^{2+}$.

Finally, in certain cases, it has been found advantageous to carry out a preliminary treatment of physical enrichment by the methods known to the skilled man such as, for example, by flotation.

It is obvious that the various preliminary treatments can be combined.

The advantages of the process according to the invention will be understood better with reference to the examples given by way of illustration.

EXAMPLE 1

A uraniferous ore having the following composition, by weight, after drying was treated in accordance with the process of the invention:

| U | 0.064% |
| --- | --- |
| $SiO_2$ | 68.4% |
| $Al_2O_3$ | 14.5% |
| $Fe_2O_3$ | 4.3% |
| MgO | 1.35% |
| CaO | 0.70% |
| $Na_2O$ | 0.70% |
| $K_2O$ | 1.65% |
| $TiO_2$ | 0.75% |
| $P_2O_5$ | 0.18% |
| various | 4.656% (including 2.0% $CO_2$ and 0.37% organic C) |

1000 kg of this ore were crushed to a particle size of less than 200μ, then introduced into an autoclave with 1051 kg of an attacking liquor containing 158 kg of $NaHCO_3$ and 30 kg of $Fe(OH)_3$ as oxidation catalyst.

The reaction medium was maintained at 200° C. for two hours. Throughout the attacking period, oxygen was injected into the reaction medium in a flow rate of the order of 3 $m^3/h$, the total pressure in the reactor being 23 bar.

At the end of this period, the autoclave was cooled then drained. The pulp obtained was filtered and washed with water. 725 liters of mother liquor and 1200 liters of washing liquor were thus collected. The mother liquor collected had the following composition:

| $Na_2CO_3$ | 26.5 g/l |
| --- | --- |
| $NaHCO_3$ | 113.5 g/l |
| Uranium | 0.58 g/l (expressed as U). |

The liquor for washing the solid fraction precipitated had the following composition:

| $Na_2CO_3$ | 6.07 g/l |
| --- | --- |
| $NaHCO_3$ | 26 g/l |
| U | 0.133 g/l |

The solid fraction collected had a uranium content of 68 ppm corresponding to a uranium yield of 89.4%.

EXAMPLE 2

A uraniferous ore which was poor in uranium and had the following composition, by weight, was treated:

| Uranium | 0.039% |
| --- | --- |
| $SiO_2$ | 70.6% |
| $Al_2O_3$ | 15.8% |
| $Fe_2O_3$ | 3.4% |
| MgO | 0.90% |
| CaO | 0.15% |
| $Na_2O$ | 2.20% |
| $K_2O$ | 3.45% |
| $TiO_2$ | 0.45% |
| $P_2O_5$ | 0.09% |
| various | 2.901% (including 0.70% $CO_2$ and 0.18% organic C) |

750 kg of this ore were crushed to a particle size of less than 200μ then introduced into an autoclave with 787 kg of an attacking liquor containing 158 kg of $NaHCO_3$ and 20 kg of $Fe(OH)_3$ as catalyst.

The reaction medium was maintained at 200° C. for 2 hours and during this period oxygen was injected at a flow rate of 2.5 $m^3/h$, the total pressure amounting to 23 bar. After filtration of the pulp, 500 liters of mother liquor and 1000 of washing liquor were collected.

The mother liquor collected had the following composition:

| $Na_2CO_3$ | 41.12 g/l |
| --- | --- |
| $NaHCO_3$ | 90.6 g/l |
| U | 0.345 g/l |

The liquor for washing the solid fraction precipitated had the following composition:

| $Na_2CO_3$ | 10.28 g/l |
| --- | --- |
| $NaHCO_3$ | 22.65 g/l |
| U | 0.08 g/l |

The solid fraction collected had a uranium content of 50 ppm, corresponding to a uranium yield of 87.3%.

EXAMPLE 3

A very carbonated uraniferous ore having the following composition, by weight, after drying was treated in accordance with the process of the invention:

| U | 0.122% |
| --- | --- |
| $SiO_2$ | 50.0% |
| $Al_2O_3$ | 9.8% |
| $Fe_2O_3$ | 4.2% |
| MgO | 3.6% |
| CaO | 10.4% |
| $Na_2O$ | 4.5% |
| $K_2O$ | 0.20% |
| $TiO_2$ | 0.40% |
| $P_2O_5$ | 0.058% |
| $V_2O_5$ | 0.008% |
| Mo | 0.01% |
| S | 0.14% |
| various | 16.562% (including 13.83% $CO_2$ and 0.205% organic C) |

600 kg of this dry ore were crushed to 160μ then introduced into an autoclave with 630 kg of an attacking liquor containing 96 kg of $NaHCO_3$ and 18 kg of $Fe(OH)_3$ as oxidation catalyst.

The autoclave was heated in such a way that the reaction medium was at 180° C., while at the same time injecting oxygen at a flow rate of 2 m$^3$/h which bubbled in the pulp. The total pressure prevailing in the autoclave during the oxidising attack was 15 bar.

After a period of 2 hours, the autoclave was cooled and drained. The pulp obtained was filtered and washed with water. 565 liters of mother liquor and 905 liters of liquor emanating from the washing of the solid fraction were collected.

The mother liquid collected had the following composition

| | |
|---|---|
| $Na_2CO_3$ | 28.5 g/l |
| $NaHCO_3$ | 108.7 g/l |
| Uranium | 1.1 g/l (expressed as U) |
| $Na_2SO_4$ | 1.28 g/l |

The liquor for washing the solid fraction precipitated had the following composition:

| | |
|---|---|
| $Na_2CO_3$ | 2.05 g/l |
| $NaHCO_3$ | 7.80 g/l |
| U | 0.08 g/l |
| $Na_2SO_4$ | 0.09 g/l |

The solid fraction collected had a uranium content of 58 ppm, corresponding to a uranium yield of 95.2%.

EXAMPLE 4

The same ore as the one treated in Example 3 was attacked under the same conditions but in the absence of an oxidation catalyst.

Temperature, duration of attack, flow rate of oxygen and pressure in the reactor were the same as in Example 3.

In the absence of any oxidation catalyst, the solid fraction collected had a uranium content of 60 ppm, corresponding to a uranium yield of 95.1%.

EXAMPLE 5

A mixed ore of uranium and molybdenum having the following composition, by weight, after drying, was treated according to the process of the invention.

| | |
|---|---|
| U | 0.255% |
| Mo | 0.054% |
| $SiO_2$ | 62.3% |
| $Al_2O_3$ | 13.5% |
| $Fe_2O_3$ | 4.1% |
| MgO | 0.34% |
| CaO | 0.59% |
| $Na_2O$ | 7.19% |
| $K_2O$ | 0.47% |
| $TiO_2$ | 0.46% |
| $P_2O_5$ | 0.07% |
| $V_2O_5$ | 0.01% |
| S | 0.1% |
| various | 10.561% (including 0.85% $CO_2$ and 0.108% organic C) |

750 kg of this dry ore were crushed to 160μ then introduced into an autoclave with 787 kg of an attacking liquor containing 150 g/l of $NaHCO_3$ and 22 kg of $Fe(OH)_3$, as oxidation catalyst.

The autoclave was heated so that the reaction medium was at 180° C., while injecting oxygen at a flow rate of 2.5 m$^3$/h, which bubbled in the pulp. The total pressure prevailing in the autoclave during the oxidising attack was 15 bar.

The autoclave was cooled and drained after a period of 2 hours. The pulp obtained was filtered and washed with water. 568 liters of mother liquor and 800 liters of liquor emanating from the washing of the solid fraction were thus collected.

The mother liquor collected had the following composition

| | |
|---|---|
| $Na_2CO_3$ | 27.5 g/l |
| $NaHCO_3$ | 109.8 g/l |
| Uranium | 2.37 g/l (expressed as U) |
| Mo | 0.195 g/l |
| $Na_2SO_4$ | 2.2 g/l |

The liquor for washing the solid fraction precipitated had the following composition:

| | |
|---|---|
| $Na_2CO_3$ | 6.2 g/l |
| $NaHCO_3$ | 24.9 g/l |
| U | 0.54 g/l |
| Mo | 0.04 g/l |
| $Na_2SO_4$ | 0.5 g/l |

The solid fraction collected has a uranium content of 64 ppm, corresponding to a uranium yield of 97.5%.

EXAMPLE 6

The same ore as the one treated in Example 5 was attacked, but in the absence of oxidation catalyst. The temperature, duration of attack, flow rate of oxygen and pressure in this reactor were the same as in Example 5, as well as the quantities of ore and of attacking liquor used.

In the absence of any oxidation catalyst, the solid fraction collected had a uranium content of 77 ppm, corresponding to a yield of 97.0%.

EXAMPLE 7

The same ore as the one mentioned in Example 5, containing uranium and molybdenum, was treated according to the process of the invention.

750 kg of this dry ore were crushed to 160μ and introduced into a autoclave with 787 kg of an attacking liquor containing 135 g/l of $NaHCO_3$ and 15 g/l of $Na_2CO_3$. The autoclave was heated so that the reaction medium was at 180° C., while at the same time injecting oxygen at a flow rate of 2.5 m$^3$/h, which bubbled in the pulp.

The total pressure prevailing in the autoclave during the oxidising attack was 15.5 bar.

The autoclave was cooled and drained after a period of 1 hour.

The pulp obtained was filtered and washed with water.

562 liters of mother liquor and 800 liters of liquor emanating from the washing of the solid fraction were thus collected. The mother liquor collected had the following composition:

| | |
|---|---|
| $Na_2CO_3$ | 28.2 g/l |
| $NaHCO_3$ | 109.2 g/l |
| Uranium | 2.46 g/l (expressed as U) |
| Mo | 0.20 g/l |

-continued

| | |
|---|---|
| $Na_2SO_4$ | 2.1 g/l |

The liquor for washing the solid fraction precipitated had the following composition:

| | |
|---|---|
| $Na_2CO_3$ | 6.6 g/l |
| $NaHCO_3$ | 25.7 g/l |
| U | 0.58 g/l |
| Mo | 0.04 g/l |
| $Na_2SO_4$ | 0.5 g/l |

The solid fraction collected had a uranium content of 82 ppm, corresponding to a yield of 96.8%.

We claim:

1. In a process for the oxidizing attack at high temperature of ores containing at least one metal from the group formed by uranium, vanadium and molybdenum, by means of an aqueous liquor containing sodium bicarbonate and sodium carbonate in the presence of free oxygen blown into the reaction medium, the separation of the sterile fractions and the liquor emanating from the attack containing the dissolved metal or metals, the improvement comprising treating the ore with an aqueous liquor containing a majority of sodium bicarbonate and a minority of sodium carbonate in which the ratio by weight of sodium bicarbonate ($NaHCO_3$) to sodium carbonate ($Na_2CO_3$) is at least 1.5, injecting the free oxygen into the reaction medium while in a reaction vessel to provide a pressure of oxygen in the reaction vessel of at least 5 bars and maintaining the temperature of the reaction medium between 160° C. and 300° C. for a period of at most 6 hours.

2. A process as claimed in claim 1, in which the ratio by weight of sodium bicarbonate to sodium carbonate is between 4 and 80.

3. A process as claimed in claim 1, in which the partial pressure of oxygen in the reactor is within the range of from 5 to 15 bar.

4. A process as claimed in claim 1, in which the temperature of the reaction medium is maintained between 180° C. and 220° C.

5. A process as claimed in claim 1, in which the $NaHCO_3$ concentration of the attacking liquor is within the range of 10 g/l and 300 g/l, while the concentration of $Na_2CO_3$ is within the range of from 0 g/l to 50 g/l.

6. A process as claimed in claim 1, which includes the step of injecting some $CO_2$ gas into the reaction medium to regulate the $CO_3H$ composition of the liquor to the desired values.

7. A process as claimed in claim 1, which includes introducing an oxidation catalyst into the reaction medium.

8. A process as claimed in claim 1 in which the sodium bicarbonate concentration of the attacking liquor is within the range of 80-160 g/l while the concentration of sodium carbonate is within the range of 0-300 g/l.

9. A process as claimed in claim 1 which includes the step of crushing the ore prior to the attack.

10. A process as claimed in claim 1 which includes pretreating the ore prior to the attack by calcining the ore at a monitored temperature.

11. A process as claimed in claim 1 which includes the step of washing the ore prior to the attack.

12. A process as claimed in claim 1 which includes pretreating the ore prior to the attack with a liquor containing $CO_3^=$ and/or $CO_3H^-$ ions combined with at least one cation selected from the group consisting of $Na^+$, $K^+$, $NH_4^+$ and $Ca^{++}$.

13. A process as claimed in claim 1 which includes the step of enriching the ore by flotation prior to the attack.

* * * * *

UNITED STATES PATENT AND TRADEMARK OFFICE
CERTIFICATE OF CORRECTION

PATENT NO. : 4,296,073

DATED : October 20, 1981

INVENTOR(S) : Pierre Maurel et al.

It is certified that error appears in the above—identified patent and that said Letters Patent is hereby corrected as shown below:

Column 4, line 42, "0.08 g/l" should read -- 0.086g/l --.

Signed and Sealed this

Thirteenth Day of April 1982

[SEAL]

Attest:

GERALD J. MOSSINGHOFF

Attesting Officer

Commissioner of Patents and Trademarks